A. E. CUMMINS.
APPARATUS FOR ENABLING SAMPLES TO BE TAKEN FROM BALES.
APPLICATION FILED FEB. 27, 1914.

1,105,759.

Patented Aug. 4, 1914.
2 SHEETS—SHEET 1.

A. E. CUMMINS.
APPARATUS FOR ENABLING SAMPLES TO BE TAKEN FROM BALES.
APPLICATION FILED FEB. 27, 1914.

1,105,759.

Patented Aug. 4, 1914.

2 SHEETS—SHEET 2.

Witnesses

Inventor

UNITED STATES PATENT OFFICE.

ARTHUR ELPHINSTONE CUMMINS, OF HAMPSTEAD, ENGLAND, ASSIGNOR OF ONE-HALF TO ROBERT BRIDGE, OF MANCHESTER, ENGLAND.

APPARATUS FOR ENABLING SAMPLES TO BE TAKEN FROM BALES.

1,105,759.   Specification of Letters Patent.   Patented Aug. 4, 1914.

Application filed February 27, 1914. Serial No. 821,623.

*To all whom it may concern:*

Be it known that I, ARTHUR ELPHINSTONE CUMMINS, a subject of the King of Great Britain, residing at 12 Belsize avenue, Hampstead, in the county of Middlesex, England, have invented new and useful Improvements in Apparatus for Enabling Samples to be Taken from Bales, of which the following is a specification.

In bales of cotton, particularly what are known as "end pressed" bales, a difficulty exists in drawing or obtaining merchant samples from the bales without having to burst the hoops holding the bales, and breaking the bales up for re-pressing, before they may be shipped or sent by rail.

By means of the machine forming the subject of this invention a perfect merchant sample may be taken from a cotton bale, without the necessity of bursting the hoops, or breaking up the bale, or re-pressing it, and the same bales may be sampled several times if desired, being afterward to the eye as perfect as originally before sampling, only of course lighter by the weight of the samples taken away. For this purpose means are provided for nipping the two sides of the bale which are not hooped, at points near one end of the bale, the other end of which rests upon a lashing plate, the grooves in which are spaced to receive the convolutions of the hoops. The hoops are then removed. The cotton above the nip is now quite slack and may be removed from the bale, in the same way as turning over a leaf of a book, this piece then remains the merchant sample, perfectly flat, and without distortion, a vital point in all merchants' cotton samples. A second lashing plate is now laid on the top of the bale and the hoops are twisted on again by hand, then the nip is loosed and the spring of the cotton will tighten up the hoops, and the bale looks the same as it did before sampling, and is in perfect condition for shipment, or sending by rail.

Figure 1:
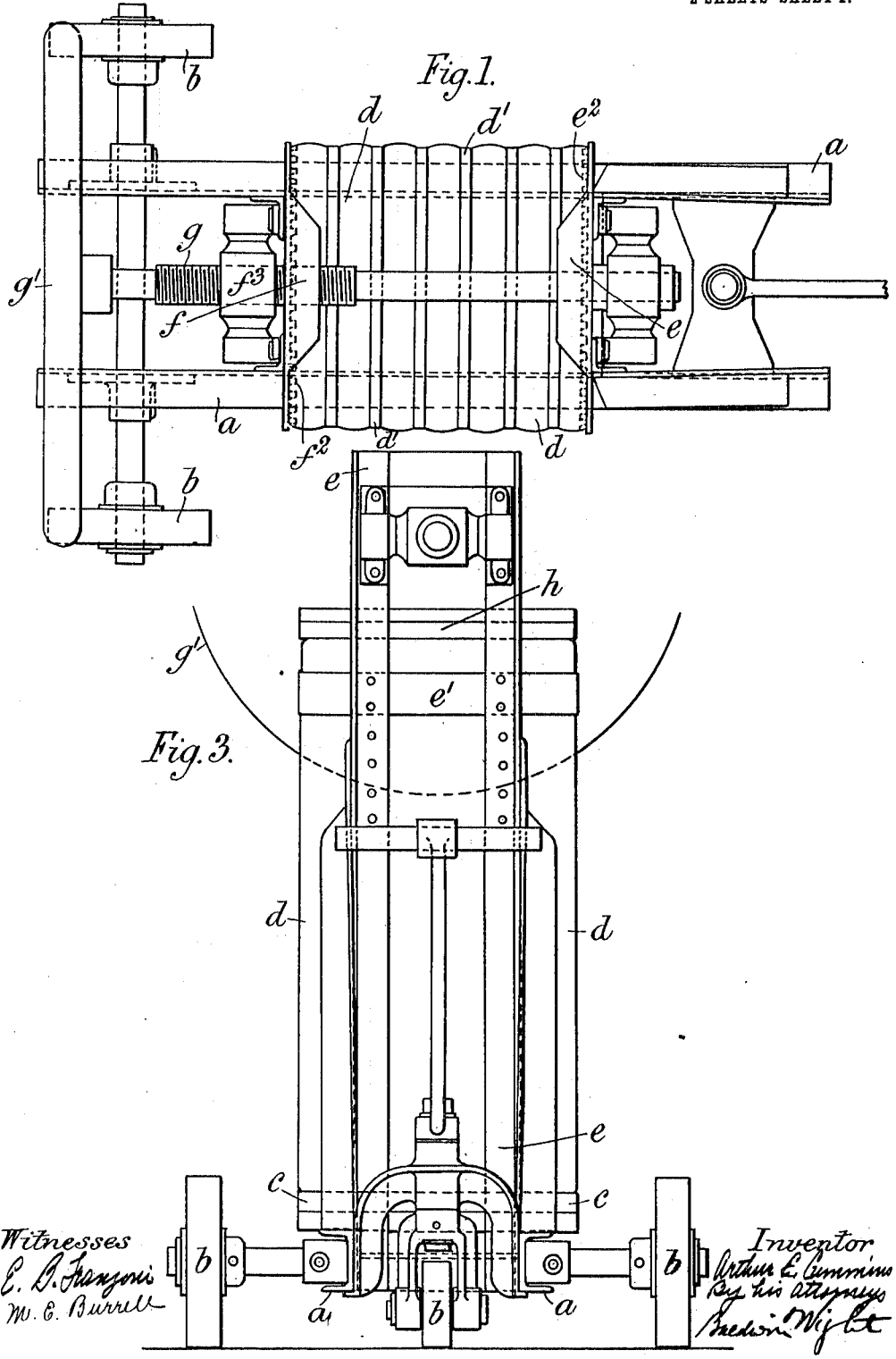
Figure 2:
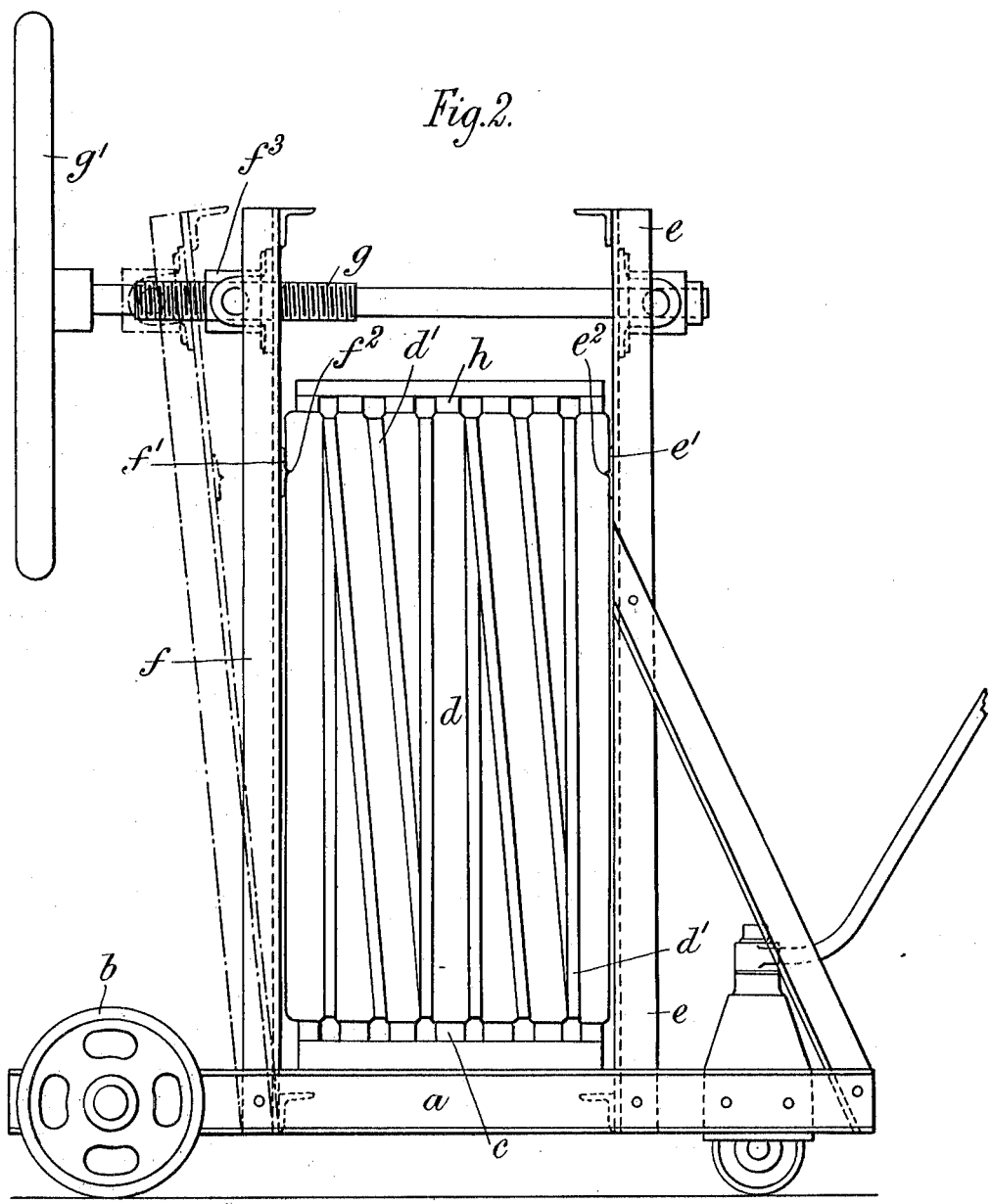

Figure 1 is a plan, Fig. 2 a side elevation, and Fig. 3 an end elevation of a machine constructed according to this invention.

$a$ is a carriage mounted on wheels $b$ and supporting a lashing plate $c$ on which the bale $d$ is placed.

$e$ is a vertical frame rigidly fixed to the carriage and $f$ is a frame pivoted to it.

$e'$ and $f'$ are cross bars fixed to the frames at any desired height by bolts.

$e^2$ $f^2$ are serrated edges projecting from the cross bars.

$g$ is a screw operated by a hand wheel $g'$ and engaging with a nut $f^3$ pivoted to the frame $f$ so that by turning the hand wheel the frame $f$ is moved toward or away from the frame $e$ thus causing the bale to be nipped by or released from the edges $e^2$ $f^2$.

$h$ is a lashing plate which is placed on the top of the bale $d$ when it is desired to replace the hoops $d'$.

What I claim is:—

1. The combination of nippers for gripping a bale on two opposite sides near one end, means for supporting the nippers a short distance from this end of the bale, means for moving the nippers toward each other into engagement with the bale a short distance from the adjacent end thereof, and an abutment for the other end of the bale adapted to prevent its expansion lengthwise when it is unhooped.

2. The combination of a platform adapted to support a bale, a vertical frame fixed to the platform, a frame pivoted to the platform, cross bars fixed to the frames, and means for forcing the pivoted frame toward the fixed frame.

3. The combination of a platform adapted to support a bale, a vertical frame fixed to the platform, a frame pivoted to the platform, cross bars fixed to the frames, a screw pivoted to the fixed frame, and a nut pivoted to the pivoted frame and engaging with the screw.

ARTHUR ELPHINSTONE CUMMINS.

Witnesses:
JOHN H. WHITEHEAD,
FRED WEATHERLY.

Copies of this patent may be obtained for five cents each, by addressing the "Commissioner of Patents Washington, D. C."